(No Model.) 6 Sheets—Sheet 1.
G. REIN.
STREET CAR REGISTER.

No. 538,283. Patented Apr. 30, 1895.

(No Model.) 6 Sheets—Sheet 2.

G. REIN.
STREET CAR REGISTER.

No. 538,283. Patented Apr. 30, 1895.

Fig. 2.

WITNESSES:
V. J. Goetz.
H. Graham

INVENTOR
Gustavus Rein,
BY
Geo. H. Graham
ATTORNEY (No Model.) 6 Sheets—Sheet 3.

G. REIN.
STREET CAR REGISTER.

No. 538,283. Patented Apr. 30, 1895.

Witnesses
V. J. Goetz.
H. Graham

Inventor
Gustavus Rein
By his Attorney
Geo. M. Graham (No Model.) 6 Sheets—Sheet 4.
G. REIN.
STREET CAR REGISTER.

No. 538,283. Patented Apr. 30, 1895.

WITNESSES:
V. J. Goetz.
H. Graham

INVENTOR
Gustavus Rein,
BY
Gust Graham
ATTORNEY

(No Model.) 6 Sheets—Sheet 5.

G. REIN.
STREET CAR REGISTER.

No. 538,283. Patented Apr. 30, 1895.

WITNESSES:
V. J. Goetz.
H. Graham

INVENTOR
Gustavus Rein,
BY
Geo. M. Graham
ATTORNEY (No Model.) 6 Sheets—Sheet 6.

G. REIN.
STREET CAR REGISTER.

No. 538,283. Patented Apr. 30, 1895.

WITNESSES:
V. J. Goetz
H. Graham

INVENTOR
Gustavus Rein,
BY
Geo. M. Graham
ATTORNEY

UNITED STATES PATENT OFFICE.

GUSTAVUS REIN, OF ST. LOUIS, MISSOURI, ASSIGNOR TO THE ST. LOUIS REGISTER COMPANY, OF SAME PLACE.

STREET-CAR REGISTER.

SPECIFICATION forming part of Letters Patent No. 538,283, dated April 30, 1895.

Application filed March 17, 1894. Serial No. 504,031. (No model.)

*To all whom it may concern:*

Be it known that I, GUSTAVUS REIN, a subject of the Emperor of Germany, residing at the city of St. Louis, State of Missouri, United States of America, have invented certain new and useful Improvements in Street-Car Registers, of which the following is a specification.

This invention relates generally to street car registers and particularly to that class set forth in United States Letters Patent to Leo Ehrlich, No. 490,342, as improved by the structure shown in a pending application for Letters Patent, of Ehrlich, Catlin, and Rein, filed October 12, 1892, Serial No. 448,660.

The present improvements are designed to provide certain additional safeguards against the fraudulent manipulations of the interior mechanism, to provide a novel means for returning the trip register to zero, a novel means for connecting the permanent register with the trip register and in certain devices by which a comparatively large permanent register is provided so that its figures are more intelligible.

In the accompanying drawings: Figs. 9 and 10 are enlarged details of a portion of the setting rod in changed positions. Fig. 11 is an end view of the parts shown in Fig. 9, looking in the direction of the arrow XI. Fig. $11^a$ is a section on the line $XI^a$ of Fig. 10, showing a cam with its ratchet face and coacting pawl. Fig. 12 is a section on the line XII of Fig. 9. Figs. 13 and 14 are detail elevations in different positions of the auxiliary stop for the trip register.

Figure 1:
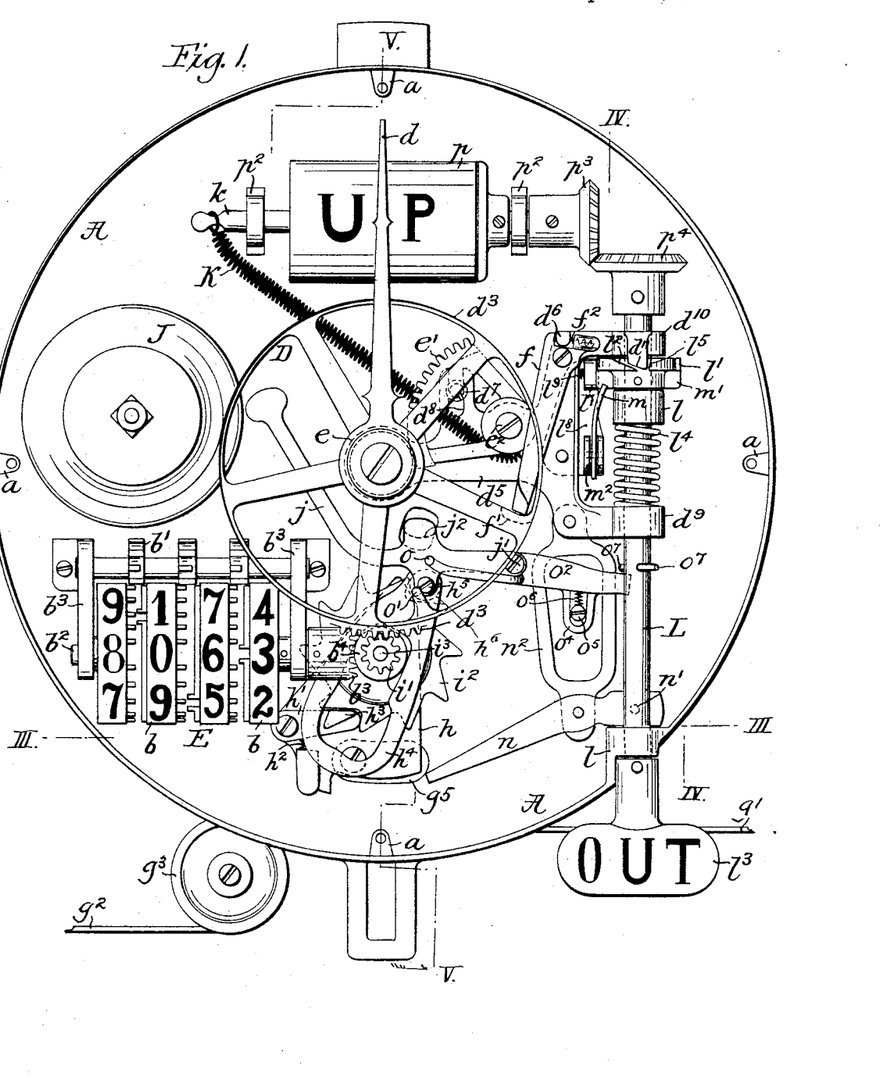
—Figure 1 is a face view of the interior mechanism in its normal position, the dial and inclosing case being removed.
Figure 2:
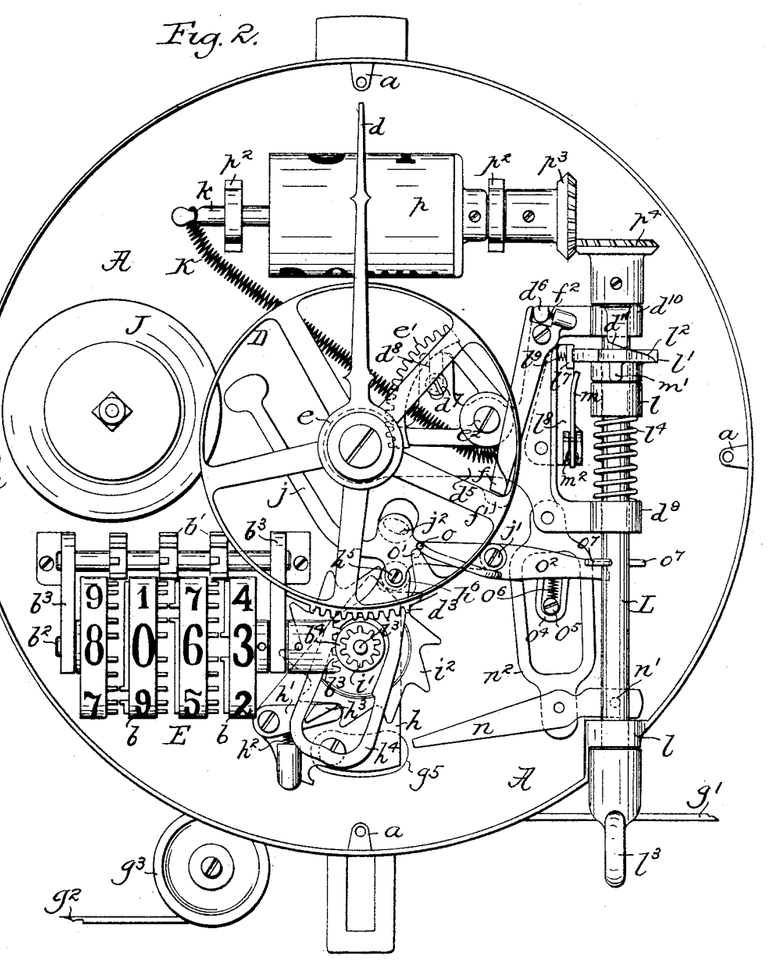
Fig. 2 is a similar view showing the parts in one of their moved positions the trip register having returned to zero.

The improved register, Figs. 1 and 2, consists of a trip register D and a permanent register E geared together so that normally when the machine is actuated by the conductor they will both move in unison.

The parts are supported by a back or base plate A and inclosed as usual by a surrounding inclosing case not shown. With the base plate A there is provided a false back B, Fig. 3, which is intended to be secured vertically to the side or end of a vehicle, all as now well known in this art, said false back inclosing the actuating segment $g$, see Figs. 3 and 17 hereinafter described, and also supporting a guide pulley $g^3$, also hereinafter referred to.

Figure 3:
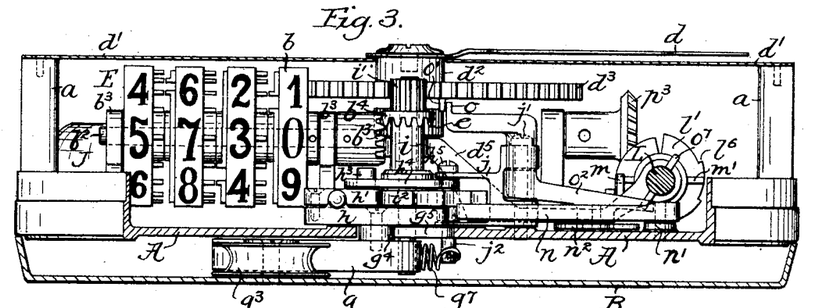
Fig. 3 is an irregular cross section on the line III—III, of Fig. 1, showing the interior parts in elevation, the dial being in place, and the index in a moved position.
Figure 4:
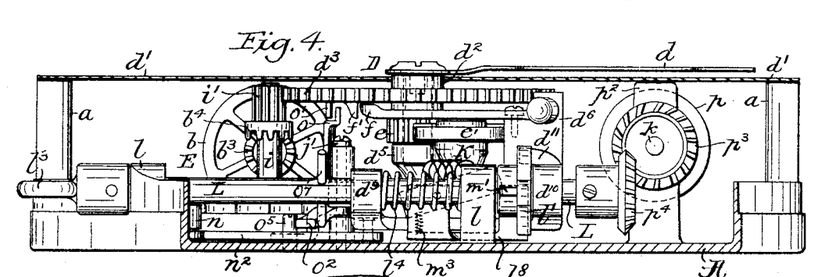
Fig. 4 is a similar section taken on the line IV—IV, of Fig. 1, the dial being in place, and the index at its zero position.
Figure 5:
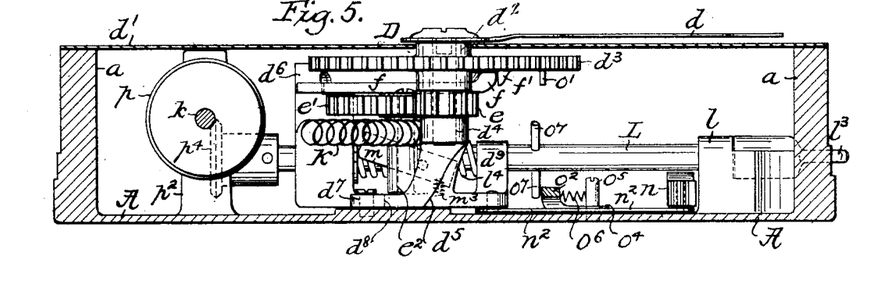
Fig. 5 is a similar section on the line V—V, of Fig. 1, looking in the direction of the arrow, the trip register wheel being shown in elevation and the index at its zero position.

The trip register D consists in the main of an index or pointer $d$ arranged to move step by step over a dial $d'$, see Figs. 3, 4, and 5, that is secured to posts $a$ projecting from the base plate A, the face of the dial not being shown as it is of well known form.

The index $d$ is secured fixedly to the hub $d^2$ of the trip-register gear wheel $d^3$ that is arranged to rotate behind the dial $d'$ on a central fixed stud $d^4$, see Figs. 5, 13, 14, 15 and 16, that projects from a bracket $d^5$ that is held in bearings on the face of the base plate A in a manner hereinafter explained. This gear wheel $d^3$ has secured to it a pinion $e$, Figs. 3, 4, 5, 15 and 16, that is in gear with the teeth of a segment $e'$ that is pivoted on a stud $e^2$ extending from the bracket $d^5$, see Figs. 5, 15 and 16, and it has a long hub $e^3$ to which one end of a motor spring K is secured, the other end of said spring being fastened to some fixed part of the machine, as for instance, the end of a shaft $k$, Figs. 1 and 2. The arrangement of this mechanism is such that during the step by step movement of the index $d$ over the dial $d'$ from the zero position, the pinion $e$ moves the segment $e'$ on its stud $e^2$ and gradually coils the spring K around its hub $e^3$, thus putting said spring under tension so that when it is desired to return the index $d$ to its zero position, the spring K acting on the segment $e'$ will suddenly move the index to said position. The construction is also such that the index $d$ may make nearly an entire rotation without its pinion $e$ becoming disengaged from the teeth of the segment $e'$, having then stored up the maximum tension in the spring K. Any farther movement of the index $d$ in a forward direction then causes the pinion $e$ to move without being in gear with the segment $e'$, its teeth slipping past the teeth of the segment, but which segment notwithstanding stands ready to immediately gear with the pinion $e$ as soon as the index $d$ is free to rotate back to the zero position. In this manner it is immaterial how many complete turns the index $d$ may have been caused to make when its pinion $e$ is out of gear with the segment $e'$; and hence it is not material how many teeth the segment may have for gearing continuously with the pinion $e$. The index $d$ is always arrested in its backward or return rotation by a zero stop $f$ arranged to meet a projection $f'$ on the rear side of the gear wheel $d^3$. See Figs. 1, 2, 5, 15, and 16. This zero stop $f$ is pivoted at one end to a post $d^6$ projecting from the bracket $d^5$ and is arranged to yield in one direction by a spring $f^2$ to allow the projection $f'$ to pass in the forward rotation of the wheel $d^3$ and is held rigid in the other direction by a portion of the stop striking the post $d^6$, as in Figs. 1 and 2.

The permanent register E consists of a series of adding wheels $b$ with suitable carrying wheel $b'$, as usual, the adding wheels $b$ being mounted on a shaft $b^2$ that is supported in bearings $b^3$ fixed to the base plate A. The units wheel of the adding wheels $b$ is fixed to the shaft $b^2$ as is common, and each rotation of said shaft and units wheel transmits through the proper carrying pinion $b'$ a step movement to the tens wheel and so on. The inner end of the shaft $b^2$ has secured to it by a bevel pinion $b^3$ that meshes with a like pinion $b^4$, Figs. 1 to 4, and 6, that is carried by an actuating sleeve $i$, which sleeve also carries at its outer end a pinion $i'$ for mesh with the trip register gear wheel $d^3$ and at its inner end near the base plate A a ratchet wheel $i^2$. This actuating sleeve $i$ turns loosely on a post $i^3$, rigidly fastened to the base plate A, and its end projects rearward through said base plate to its rear side and forms a bearing $i^4$, Figs. 6 and 17, for an actuating segment $g$ now to be described.

Figure 17:
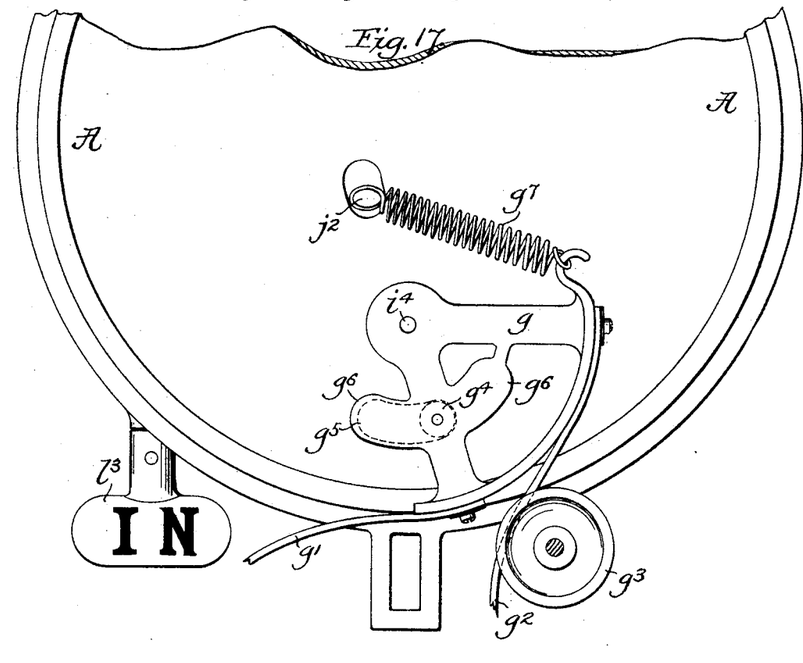
Fig. 17 is a rear view of the lower portion of the back or base plate of the machine showing the actuating segment and its immediate connection.

The actuating segment $g$, Figs. 3 and 17, lies snugly against the rear of the base plate and is arranged to rock within fixed limits by the pull upon either one of two cords or straps $g'$, $g^2$, one end of each of which is secured to the rim of this segment at distant points, and one strap being arranged to pass around a guide pulley $g^3$ so that it may extend in a direction opposite to the strap $g'$.

Figures 6, 7, 8:
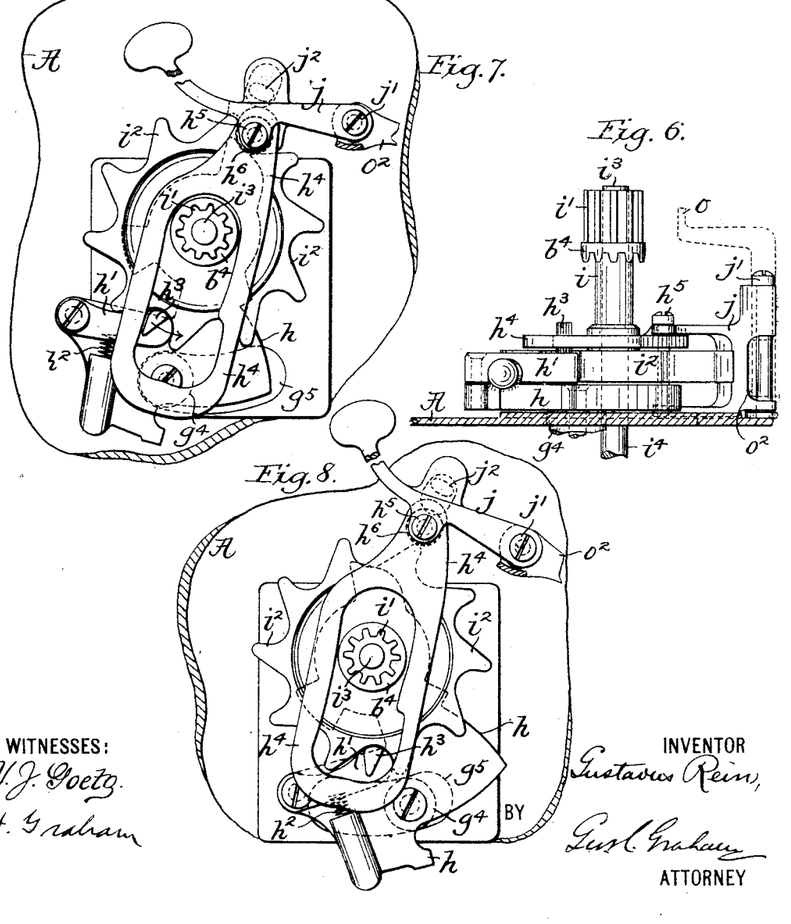
Fig. 6 is an enlarged side elevation of the main actuating spindle with its immediate connection, the permanent and trip registers being removed.
Figs. 7 and 8 are enlarged elevations of the parts shown in Fig. 6 in different positions.

The segment $g$ carries a rigid projection $g^4$, Figs. 3 and 17, and 6 to 8, that extends through a guide slot $g^5$ in the base plate A—the segment having flanges $g^6$ which always overlie and protect said slot to prevent fraudulent ingress to the interior mechanism—and said projection $g^4$ is rigidly connected to a pawl carrier $h$ lying against the inner face of the base plate A at the rear of the ratchet wheel $i^2$, and also mounted to rock bodily with the segment $g$ on the fixed post $i^3$. This pawl carrier $h$ carries a pawl $h'$ pivoted thereto, Figs. 6 to 8, which engages with the ratchet wheel $i^2$ and is spring-pressed by a spring $h^2$. The outer side of the end of the pawl $h'$ has a projection $h^3$ that extends within the opening of a yoke $h^4$ that straddles the actuating sleeve $i$ immediately adjacent the ratchet wheel $i^2$ and is connected by a pin or screw $h^5$ with a bell hammer arm $j$ that is pivoted at $j'$ to the base plate A. The pin $h^5$ carries an antifriction roll $h^6$ arranged to bear against the face of the ratchet wheel $i^2$ at a point substantially diametrically opposite the engaging pawl $h'$ so that said bell hammer arm $j$ is positively rocked away from the axis of the ratchet wheel $i^2$ and the yoke $h^4$ connected to said bell hammer arm is moved longitudinally in the direction of its length by the action of a passing tooth of said ratchet wheel as the pawl $h'$ is moving said ratchet wheel forward one step. The high part of the passing ratchet tooth, as in Fig. 8, is passing the roll $h^6$, just before the pawl $h'$ completes its forward actuating stroke in one direction, so that a slight farther movement of said pawl and the ratchet wheel $i^2$ will remove said passing tooth from contact with the roll $h^6$, whereupon the bell hammer arm will be free to suddenly move toward the axis of the ratchet wheel $i^2$ with the roll $h^6$ entering the low part of recess between adjacent teeth of said ratchet wheel $i^2$ as in Fig. 7, thereby bringing the hammer in forcible contact with the bell J, Figs. 1 and 2. This return of the bell hammer arm $j$ also moves the yoke $h^4$ back to its normal position. The rocking of the bell hammer arm $j$ is had against the force of a spring $g^7$, see Figs. 3 and 17, one end of which is attached to a lug $j^2$ on the rear side of the arm $j$, see Figs. 7 and 8, which projects through a slot in the base plate A, the other end of said spring $g^7$ being connected to the actuating segment $g$ and thus serves two purposes, one to return the segment $g$ to normal position after being moved by the conductor in one direction in registering a fare, and also to exert pressure on the bell hammer arm $j$ to cause its hammer to strike the bell J.

The yoke $h^4$ connected to move with the bell hammer arm $j$, as before specified, forms at all times a guard for the actuating pawl $h'$. Thus in the normal resting position of the parts as in Fig. 7, the left hand side of the pawl projection $h^3$ is against the left side of the yoke $h^4$. As the pawl $h'$ is moved in the direction of the arrow thereon, moving with it the ratchet wheel $i^2$, the yoke $h^4$ is simultaneously moved longitudinally in the direction of its length bringing the end wall of said yoke toward the pawl projection $h^3$ so that the pawl $h'$ is guarded from being moved out of engagement with the ratchet wheel $i^2$ and the yoke remains in substantially this position, as in Fig. 8, up to the completion of the forward or active movement of the pawl at which time the said wall of the yoke $h^4$ retires on the sudden reverse longitudinal movement of said yoke when the roll $h^6$ moves into the low part of the ratchet wheel $i^2$ as before explained. This last movement of the yoke $h^4$ leaves sufficient space between its said end wall and the pawl projection $h^3$ to allow the pawl $h'$ to rock out of engagement with the ratchet wheel $i^2$ on the backward or return stroke of said pawl in moving idly to the position shown in Fig. 7.

As so far described the trip and permanent registers are adapted to be moved step by step in unison and the bell sounded each time the conductor actuates the actuating segment $g$ by pulling on one or the other of the cords $g'$, $g^2$, the two registers being in gear with the actuating sleeve $i$ as before explained; and as this step by step movement continues, the motor spring K is being gradually placed under more tension by the rotation of the segment $e'$, thus storing up power to return the trip register to zero at the desired time.

The means for returning the trip register to zero in the present case consist of a rotatable shaft L having connection with the support for the trip register gear wheel $d^3$ whereby the teeth of said gear are removed from mesh with the pinion $i'$ thereby freeing said wheel $d^3$ of all backward restraint and allowing the motor spring K acting through the segment $e'$ and pinion $e$ to automatically rotate the gear wheel $d^3$ and index $d$ backwardly until the projection $f'$ strikes the zero stop $f$ and brings the index $d$ to rest at the zero position.

As before explained the index $d$, gear wheel $d^3$, pinion $e$ and segment $e'$, are mounted and carried by the bracket $d^5$. This bracket $d^5$, see Figs. 1, 2, 4, 5, 9, 10, 15, and 16, is mounted to slide bodily on the back plate A from the normal position shown in Figs. 1, 9, and 13, with the gear wheel $d^3$ in mesh with the pinion $i$ into the position shown in Figs. 2, 16, and 14, with said gear and pinion out of mesh. The bracket $d^5$ is guided in this sliding movement by a screw stud $d^7$, Figs. 1, 2, 5 and 16, that passes through a slot $d^8$ in the foot of said bracket, and also by a pair of separated hubs $d^9$, $d^{10}$ projecting from the foot of the bracket $d^5$, which embrace and slide loosely on the rotatable shaft L.

The shaft L is mounted in fixed bearings $l$ projecting from the back plate A and carries near its inner end a cam $l'$ which in this instance is provided with two inclines or cam-faces $l^2$ (see Fig. 11$^a$) arranged to act in succession but at different periods of time on a co-acting lug or projection $d^{11}$ rising from the hub $d^{10}$ of the bracket $d^5$, Figs. 1, 2, 4, 9, and 10. When the shaft L is rotated by means of a grasping piece $l^3$ secured to its outer end on the exterior of the inclosing case, the cam $l'$ is also rotated causing one of its inclines $l^2$ in bearing against the projection $d^{11}$ to force the bracket $d^5$ in the direction of the arrow 1, Fig. 9, into the position shown in Fig. 10, against the force of a spring $l^4$ that is coiled about the shaft L between one of the bearings $l$, and the bracket hub $d^9$, to be held temporarily in such position by the lug $d^{11}$ riding on the flat face of the cam $l'$ until a recess $l^5$ in the face of said cam $l'$ arrives adjacent the lug $d^{11}$ and allows said spring $l^4$ to act to force the bracket $d^5$ back to its normal position. This reciprocation of the bracket $d^5$ upward and back to its normal position has occurred during a half rotation of the shaft L during which time the trip register gear $d^3$ has been disconnected from the pinion $i'$, the motor spring K has acted to return the index $d$ to the zero position and gear $d^3$ has been returned in mesh with the pinion $i'$. In the next half rotation of the shaft L the action will be repeated, so that in one complete rotation of said shaft L two reciprocations of the bracket $d^5$ will have occurred, and for this purpose said cam $l'$ is provided with the two inclines or cam-faces $l^2$ which are duplicates of each other and each serve the same function at different times. Of course the cam $l'$ need have only a single incline $l^2$ in which case the shaft L would need to make a complete rotation each time the trip register is to be returned to zero. Owing to the prompt action of the motor spring K, however, it is perfectly practicable to obtain the return of the trip register to zero during a semi-rotation of the shaft L. The opposite flat faces of the grasping piece $l^3$ may be marked, as in Figs. 1 and 17 with indications such as "Out" or "In" only one of which is exposed to view at a time and may denote the outgoing and incoming trips of the vehicle on which the register is used.

Figures 9, 10, 11, 12, 13:
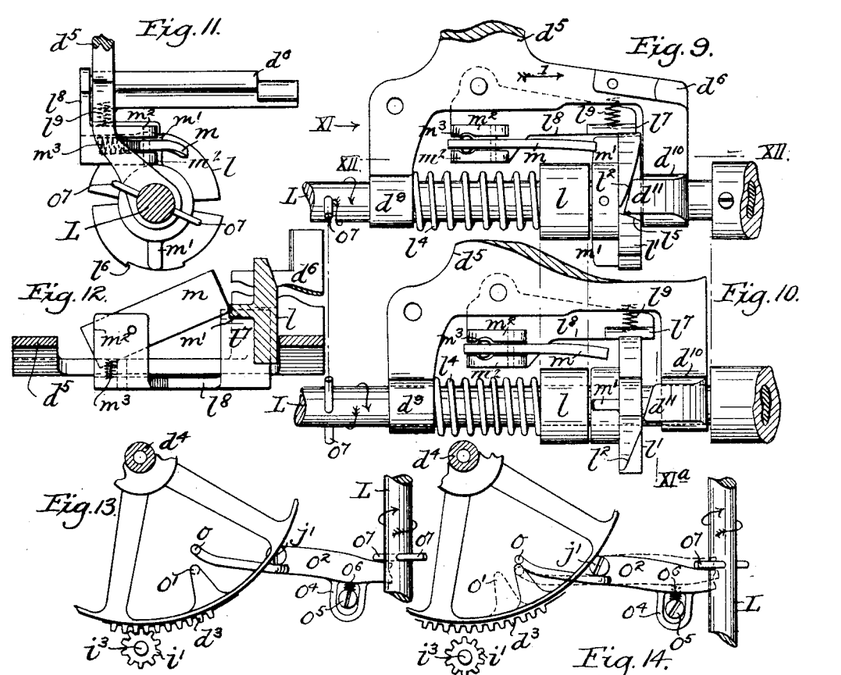
Figure 11A:
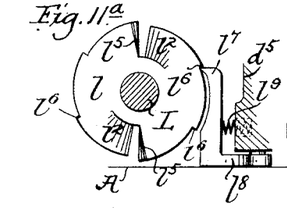
Figure 15:
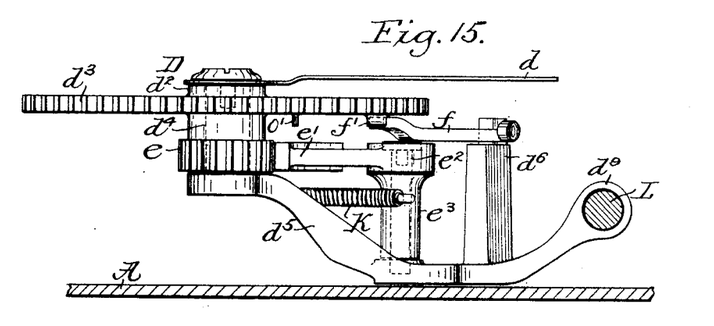
Fig. 15 is a detail elevation of the trip register wheel, pinion, and segment and supporting bracket.
Figure 16:
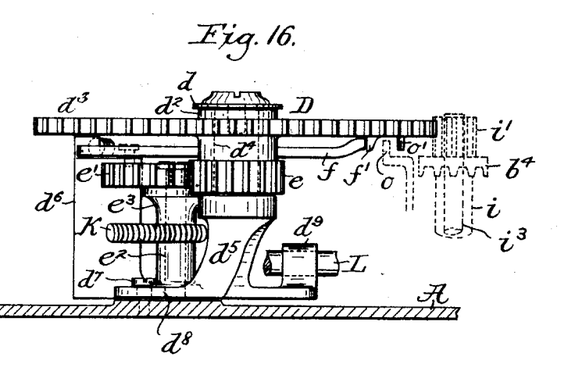
Fig. 16 is a similar view looking from the left of Fig. 15.

To prevent backward rotation of the shaft L there is provided a pawl and ratchet, the functions of which in this instance are performed by a series of teeth $l^6$ on the periphery of the cam $l'$, see Figs. 11 and 11$^a$, and a coacting finger $l^7$ carried by a rock-plate $l^8$ pivotally connected to and movable with the foot of the bracket $d^5$, a spring $l^9$ being employed to hold the finger $l^7$ to duty against the teeth $l^6$. See Figs. 1, 2, 9, 10, 11, and 11$^a$. The finger $l^7$ has a long face so as to constantly engage with the teeth $l^6$ during the reciprocation of the bracket $d^5$.

Another guard against backward rotation of the shaft L, as well as a guard against any attempt to bodily move the bracket $d^5$ independent of the movement imparted by the shaft L, is provided in the shape of a tongue $m$, see Figs. 1, 2 and 9 to 12, whose end engages the rear of one or the other of a pair of ribs $m'$ extending from the back of the cam $l'$. This tongue is free to be rocked in the usual rotation of the shaft L and its cam $l'$, but should a backward rotation thereof be attempted said tongue will become wedged against the face of one of the ribs $m'$, the rib $m'$ acting to force the bracket $d^5$ in a direction the reverse of that which it should take to disconnect the gear $d^3$ from the pinion $i'$, and hence the projection $d^{11}$ carried by the bracket $d^5$ is held firmly in engagement with the recess $l^5$ of the cam $l'$ making the shaft L practically immovable in the reverse direction, and also making it impossible to bodily move the bracket $d^5$ in a direction to disconnect the gear $d^3$ from the pinion $i'$ without first removing the obstruction formed by the tongue $m$. This tongue $m$ is pivotally mounted between a pair of lugs $m^2$ extending from the rock-plate $l^8$ and one end of said tongue is borne upon by a spring $m^3$, see Figs. 5, 11, and 12, to allow said tongue $m$ to yield in one direction when its opposite free end is met by one of the ribs $m'$ in the proper rotation of the shaft L.

Another safeguard against fraudulent manipulation of the register consists in a stop $n$, Figs. 1, 2, 3, and 5, arranged, when the trip register gear $d^3$ is disconnected or moved to be disconnected from the pinion $i'$, to form an abutment at one side of the pawl carrier $h$ so that any attempt to move such pawl carrier to operate the ratchet $i^2$ is prevented. This stop $n$ is pivotally attached at $n'$ to the base plate A, Figs. 1, 2, and 3, the opposite free end being arranged to be moved from its normal inactive position, Fig. 1, into its active stopping position, Fig. 2, by means of a link $n^2$ connected at one end to said stop $n$ and at the other end connected to the foot of the bracket $d^5$, the link being slotted to pass unobstructed around other parts of the register mechanism to be hereinafter described. The effect of the connection of the stop $n$ with the bracket $d^5$ is that each time the bracket $d^5$ is moved to disconnect the trip register gear $d^3$ from the pinion $i'$ in the act of resetting or returning the trip register to zero, the stop $n$ is simultaneously moved to form an abutment or obstruction preventing any movement of the pawl carrier $h$, and hence the permanent register E cannot be moved while the trip register is disconnected therefrom. On the return of the bracket $d^5$ to its normal position, the stop $n$ is simultaneously removed from its active position into the position shown in Fig. 1.

An additional or supplemental zero stop $o$ is provided, see Figs. 1 to 4, 13, and 14, arranged to co-operate with an abutting pin $o'$ carried by the trip register gear $d^3$, said zero stop being movable into active position at the commencement of the act of resetting or returning the trip register to zero. This supplemental zero stop $o$ is formed by the end of an arm $o^2$ (see said figures) loosely pivoted on the pin $j'$ and in a bifurcation of the bell hammer $j$. See Fig. 6. Near the opposite outer free end of this arm $o^2$ it is provided with a slotted finger $o^4$ straddling a pin $o^5$ projecting from the base plate A and borne upon by a spring $o^6$ that is interposed between the pin $o^5$ and the arm $o^2$. The extreme end of this portion of the zero stop arm $o^2$ is arranged to be pressed to one side, compressing the spring $o^6$ by a radial pin $o^7$ carried by the shaft L which pin in the normal inactive position of said shaft holds the zero stop $o$ out of active position away from contact with the coacting abutting pin $o'$ as in Figs. 1 and 13. As soon as the shaft L is started to rotate the radial pin $o^7$ leaves the end of the zero stop arm $o^2$ so that the spring $o^6$ is free to rock said arm and move the zero stop $o$ into active position as indicated by the dotted lines Fig. 14, the coacting abutting stop $o'$ not being present at such time if the register has been actuated to register fares, said stop $o'$ occupying, for instance, the position indicated by dotted lines, Fig. 14. Immediately the trip register gear $d^3$ has been moved free from the pinion $i'$, the motor spring K being then free to act suddenly rotates said gear $d^3$ backwardly, bringing the abutting pin $o'$ forcibly against the zero stop $o$, rocking such stop to a limited extent against the pin $o^5$ and holding the gear $d^3$ against farther movement at which time the index $d$ stands at zero on the dial $d'$. As soon as the trip register gear $d^3$ is returned in mesh with the pinion $i'$, the abutting pin $o'$ leaves the zero stop $o$ and at the same time the radial pin $o^7$ has been brought around to again bear against the free end of the arm $o^2$ to rock its zero stop $o$ into inactive position so that during the forward step by step movements of the trip register the said stop $o$ will be out of the path of the abutting pin $o'$ should the trip register be rotated a complete turn or more during the registering operations.

The register is provided with a direction indicator in the form of a horizontal roll $p$ having a shaft $k$ mounted in fixed bearings, provided by brackets $p^2$, projecting from the base plate A, Figs. 1 to 4. The surface of the roll $p$ bears indications such as "Up" or "Down" arranged in this instance at diametrically opposite points on the roll to show as usual through an opening (not shown) in the dial $d'$. One end of the shaft $k$ of this roll $p$ carries a gear $p^3$ that is constantly engaged by a gear $p^4$ fast to the end of the shaft L so that each time the shaft L is rotated a half turn the direction indicator roll $p$ is rotated a half turn to bring another indication to view.

In providing the register with the trip register movable out of gear with the permanent register in lieu of moving the permanent register in the manner set forth in Patent No. 490,342, hereinbefore mentioned, certain important advantages are obtained, chief of which reside in rendering it possible to mount the permanent register in a new position with respect to the trip register gear so that the adding wheels of the permanent register may be materially increased in size; in the fact that the parts of the trip register as well as others in practice intimately associated with the trip register may be all assembled in position on the bracket $d^5$ while out of the machine, and then bodily as a single piece mounted in position on the base plate of the machine, thus rendering it possible for more than one workman to work to advantage in assembling the parts on each machine; and in lessening the number of accurate machine operations needed on the base plate which is large and of thin metal to prepare it to receive the trip register parts, these operations in the present case being limited to one tapped hole for the guide stud $d^7$, resulting in a material lessening of broken castings and a greater facility in assembling and completing the register for the market. The improved structure also renders it possible to employ straight gears in lieu of bevel gearing with the trip register; to mount the actuating pawl and ratchet on an axis separate from the permanent register wheels' axis and yet keep them in constant gear with the ratchet, and it enables the ratchet, pawl, and pawl-carrier to be greatly increased in size and strength without increasing the size of the machine to accommodate such increase.

What is claimed is—

1. In a register the combination of a permanent register, a trip register comprising a dial and an index or pointer one of which parts is movable, and normally in gear with the permanent register, and means for moving the latter part of the trip register out of gear with the permanent register and resetting it relative to the stationary part of the trip register, substantially as set forth.

2. In a register the combination of a permanent register, a trip register comprising a dial in front of the permanent register and an index, one of which parts is movable and normally in gear with the permanent register, and means for moving the latter part of the trip register out of gear with the permanent register and resetting it relative to the stationary part of the trip register, substantially as set forth.

3. In a register the combination of a permanent register, a trip register comprising a dial and an index one of which parts is normally in gear with the permanent register, a movable bracket carrying the part so in gear, resetting means for the trip register, and an operating handle connected with said bracket for moving it, substantially as set forth.

4. In a register the combination of a permanent register, a trip register comprising a dial and an index one of which parts is movable and normally in gear with said permanent register, an automatic motor for returning the latter part of the trip register to zero, and means for moving the latter part of the trip register out of gear with the permanent register, to allow the motor to act, substantially as set forth.

5. In a register, the combination with the fixed permanent register, of a sliding bracket, the trip register carried by said bracket, gearing connecting the two registers, and a cam for sliding the bracket and disconnecting the trip register from the permanent register, as set forth.

6. In a register, the combination with the fixed permanent register, of the movable trip register normally in gear with the permanent register, a spring for holding said trip register in gear and a cam acting against the spring to move the trip register out of gear with the permanent register, as set forth.

7. In a register, the combination of the permanent register, the movable trip register normally in gear with the permanent register, a cam for moving the trip register out of gear and a locking tongue preventing disengaging movement of the trip register independent of the cam, as set forth.

8. In a register, the combination of the permanent register, the trip register normally in gear with the permanent register, an automatic motor for returning the trip register to zero, a supplemental zero stop for the trip register, and an operating handle for disconnecting the two registers and moving the supplemental zero stop into active position, as set forth.

9. In a register, the combination of the fixed permanent register, a movable bracket, the trip register normally in gear with said permanent register, and having a pinion carried by said bracket, a segment engaging said pinion also carried by the bracket, a motor spring connected to the segment to return the trip register to zero, and an operating handle for moving the bracket to disconnect the two registers and permit the motor spring to act, as set forth.

10. In a register, the combination of the fixed permanent register, the trip register comprising a dial and an indicator one of which parts is movable and normally in gear with the permanent register, an operating shaft for moving the latter part of the trip register out of gear, a direction indicator, and connections with the shaft for moving said indicator, and means for returning the trip register to zero, as set forth.

11. In a register, the combination of the permanent register, the trip register having its axis of rotation at right angles to the axes of rotation of the permanent register, an actuated shaft independent of the registers and having gearing connecting the two registers together, a ratchet wheel connected to the shaft and a pawl engaging said ratchet wheel for operating said shaft, substantially as described.

12. In a register, the combination with the permanent and trip registers, of a pawl and ratchet for operating said registers, a guard independent of and partially surrounding the pawl and a stud or roll carried with the guard and engaging the ratchet, as set forth.

13. In a register, the combination with the permanent and trip registers, of a pawl and ratchet for operating said registers, a pawl carrier carrying said pawl, all mounted on one side of a supporting back plate, and an operating lever pivoted to and carried by the opposite side of said back plate and having a connection with the pawl carrier projecting through the back plate, as set forth.

14. In a register, the combination with a substantially centrally mounted trip register, of a permanent register the longitudinal axis of which extends at a tangent to said trip register, and an actuating gear shaft connecting the two registers, as set forth.

In witness whereof I have hereunto signed my name in the presence of two witnesses.

GUSTAVUS REIN.

Witnesses:
FRANK M. WILLIAMS,
GEO. F. WALKER.